US012498114B2

(12) United States Patent
Finch et al.

(10) Patent No.: US 12,498,114 B2
(45) Date of Patent: *Dec. 16, 2025

(54) APPARATUS FOR ILLUMINATING OUTDOOR BAG TOSS GAME

(71) Applicant: Brightz, Ltd., Ottawa Lake, MI (US)

(72) Inventors: Ronald Finch, Ottawa Lake, MI (US); Michael Sauppe, Ottawa Lake, MI (US)

(73) Assignee: Brightz, Ltd., Ottawa Lake, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/606,736

(22) Filed: Mar. 15, 2024

(65) Prior Publication Data

US 2024/0219021 A1 Jul. 4, 2024

Related U.S. Application Data

(63) Continuation of application No. 18/172,793, filed on Feb. 22, 2023, now Pat. No. 11,959,628, which is a continuation of application No. 17/889,968, filed on Aug. 17, 2022, now Pat. No. 11,635,201, which is a continuation of application No. 17/748,440, filed on May 19, 2022, now Pat. No. 11,460,186, which is a continuation of application No. 16/529,009, filed on (Continued)

(51) Int. Cl.

| | |
|---|---|
| ***F21V 33/00*** | (2006.01) |
| ***A63B 67/06*** | (2006.01) |
| ***F21S 4/22*** | (2016.01) |
| ***F21S 9/02*** | (2006.01) |
| ***F21V 21/088*** | (2006.01) |
| ***F21V 23/00*** | (2015.01) |
| ***F21V 23/04*** | (2006.01) |
| *F21Y 103/37* | (2016.01) |
| *F21Y 115/10* | (2016.01) |

(52) U.S. Cl.

CPC ............ *F21V 33/008* (2013.01); *A63B 67/06* (2013.01); *F21S 4/22* (2016.01); *F21S 9/02* (2013.01); *F21V 21/088* (2013.01); *F21V 23/001* (2013.01); *F21V 23/04* (2013.01); *A63B 2225/74* (2020.08); *F21Y 2103/37* (2016.08); *F21Y 2115/10* (2016.08)

(58) Field of Classification Search

CPC .... A63B 67/06; F21S 4/22; F21S 9/02; F21V 21/088; F21V 23/04; F21V 23/001; F21V 33/008

See application file for complete search history.

(56) References Cited

U.S. PATENT DOCUMENTS

| | | | |
|---|---|---|---|
| 4,918,578 | A | 4/1990 | Thompson |
| 5,711,727 | A | 1/1998 | Edge et al. |

(Continued)

*Primary Examiner* — Erin Kryukova
*Assistant Examiner* — Nathaniel J Lee
(74) *Attorney, Agent, or Firm* — Vorys, Sater, Seymour and Pease LLP; Rex W. Miller, II

(57) ABSTRACT

An illuminated cornhole platform comprising a top portion, at least two side portions, a front portion, a hole portion, at least one leg portion, and a back portion. The cornhole platform is illuminated by one or more illumination sources positioned to illuminate a length concentric to the hole portion of the rectangular portion. Additionally, the one or more illumination sources are light emitting diodes.

3 Claims, 8 Drawing Sheets

Related U.S. Application Data

Aug. 1, 2019, now Pat. No. 11,371,693, which is a continuation of application No. 15/351,183, filed on Nov. 14, 2016, now Pat. No. 10,401,020.

(60) Provisional application No. 62/318,539, filed on Apr. 5, 2016, provisional application No. 62/255,100, filed on Nov. 13, 2015.

(56) References Cited

U.S. PATENT DOCUMENTS

| | | | | | |
|---|---|---|---|---|---|
| 5,833,558 | A * | 11/1998 | Pettle | A63B 63/083 473/485 |
| 6,265,834 | B1 | 7/2001 | Lin | |
| 7,854,528 | B2 | 12/2010 | Segretto et al. | |
| 8,162,318 | B1 | 4/2012 | Peterson et al. | |
| 8,807,569 | B1 * | 8/2014 | Davis | F41J 5/20 473/570 |
| 9,115,858 | B2 | 8/2015 | Levante et al. | |
| 10,401,020 | B2 * | 9/2019 | Finch | F21V 21/088 |
| 11,371,693 | B2 * | 6/2022 | Finch | A63B 67/06 |
| 11,460,186 | B2 | 10/2022 | Finch et al. | |
| 11,635,201 | B2 * | 4/2023 | Finch | F21S 4/22 362/191 |
| 2007/0089338 | A1 | 4/2007 | Barnhouse et al. | |
| 2007/0171640 | A1 | 7/2007 | Sloan et al. | |
| 2009/0091926 | A1 * | 4/2009 | Segretto | A63B 67/06 362/249.02 |
| 2014/0084774 | A1 | 3/2014 | Phillips | |
| 2014/0315667 | A1 | 10/2014 | Manner et al. | |
| 2014/0334142 | A1 * | 11/2014 | Levante | F21S 4/22 362/222 |
| 2015/0054221 | A1 * | 2/2015 | Sandman | A63B 60/16 273/402 |
| 2017/0089528 | A1 | 3/2017 | He | |
| 2017/0261188 | A1 * | 9/2017 | Brindle | A45D 42/10 |

* cited by examiner

APPARATUS FOR ILLUMINATING OUTDOOR BAG TOSS GAME

This non-provisional patent application is a continuation of and claims priority to and benefit of U.S. patent application Ser. No. 17/889,968, filed on Aug. 17, 2022, which claims priority to and benefit of U.S. patent application Ser. No. 17/748,440, filed on May 19, 2022, now, U.S. Pat. No. 11,460,186, issued on Oct. 4, 2022, which claims priority to and benefit of U.S. patent application Ser. No. 16/529,009, filed on Aug. 1, 2019, now, U.S. Pat. No. 11,371,693, issued on Jun. 28, 2022, which claims priority to and benefit of U.S. patent application Ser. No. 15/351,183, filed on Nov. 14, 2016, now, U.S. Pat. No. 10,401,020, issued on Sep. 3, 2019, which claims priority to and benefit of U.S. Provisional Patent Application No. 62/318,539, filed on Apr. 5, 2016, and U.S. Provisional Patent Application No. 62/255,100, filed on Nov. 13, 2015, all of which are incorporated herein by reference.

BACKGROUND

This invention relates to an illuminated bag toss platform, or more generally an illuminated "cornhole" platform.

There are a number of bag toss games that are played under conditions of low ambient light, such as "cornhole" or "corn toss." In the game, players take turns pitching small bags at an inclined platform having a hole with a diameter that is designed for the bags to fit through, centered on the platform but with a vertical disposition towards the far end of the platform. The platforms are generally rectangular and consist of a platform surface generally made of rigid material, and foldable risers that elevate and support the vertically inclined end of the platform.

Being mostly an outdoor game, cornhole is generally played during daylight hours when the players are able to distinguish distance relatively easily and see their target, the platform, and more specifically the hole. However, since it is an excellent outdoor party game, it is often played during the evening where the lighting may not be optimal. Providing sufficient lighting for evening play is inconvenient and sometimes undesirable, since other lighting apparatuses may detract from the ambiance desired at an outdoor party. Thus, there is still a need for a kit to illuminate the platform with sufficient lighting to enable outdoor play in low-light conditions.

SUMMARY

Accordingly, the present disclosure enables bag toss games to be played under conditions of low ambient light by providing an illuminated cornhole platform. While there are many embodiments of the present invention, in one embodiment the platform contains a power supply which can be attached on an underside of the platform, the power supply powering two wires of Light Emitting Diodes (LEDs). The first wire of LEDs may be placed under the platform on the lower half of the hole in the center of the platform. The second wire of LEDs may be wrapped around the exterior of the platform, attached to side walls forming structural support for the top of the platform. The first wire of LEDs and the second wire of LEDs may be attached to the cornhole platform by way of a fastener. Alternatively, or in addition, the first wire of LEDs and the second wire of LEDs may be attached by way of adhesive, mounting bracket, or any other suitable method.

Because lights on the cornhole platform may be distracting to the players or may affect the players' vision of the platform surface or hole, in some embodiments the first wire of LEDs and the second wire of LEDs may be installed on the underside of the platform creating lighting underneath and around the perimeter of the cornhole platform. In other embodiments, a LED wire may be placed only on the lower half of the hole to prevent players from directly staring at the plurality of light sources while playing.

The LED wire or wires may be of any suitable single color or multiple color combination. The power supply may be capable of changing the color emitted by the LED wires, or the LED wires may be of a fixed color.

In some embodiments, the LED wire may comprise a flexible water-resistant sheath which may encapsulated the LEDs and electrical wires connected to the power supply.

DETAILED DESCRIPTION OF THE FIGURES

Figure 1:
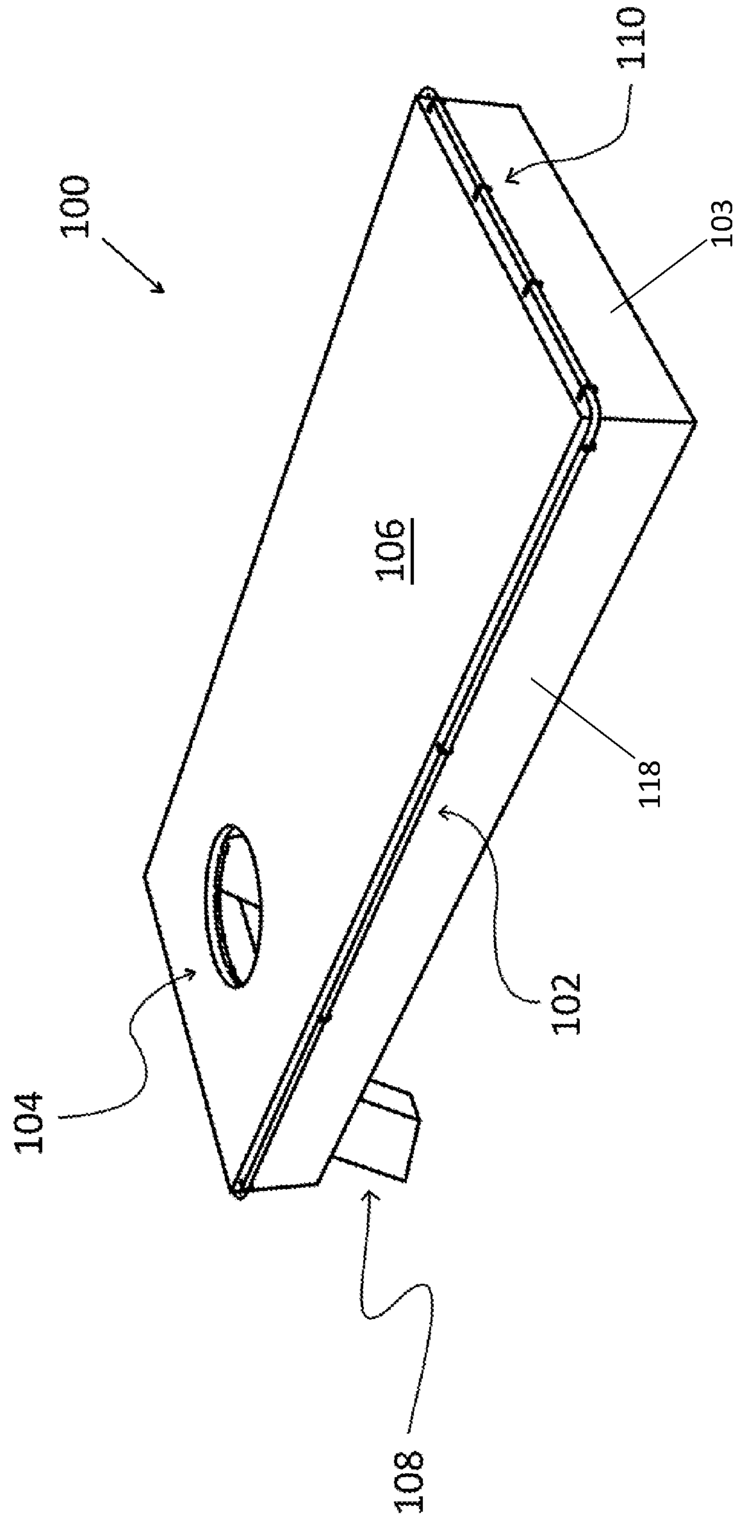
FIG. 1 illustrates a front-end perspective view of an illuminated cornhole platform.

FIG. 1 illustrates a perspective view of an illuminated cornhole platform 100. Typically, the illuminated cornhole platform 100 is rectangular. A top portion 106 forms the upper part of the platform and contains a hole portion 104. Below the top portion is a front portion 103, at least two side portions 118, and a back portion 120 (see FIG. 2). A leg portion 108 is attached to the side portion 118. The leg portion 108 functions to lift the whole apparatus at an angle relative to the ground. Typically, a platform will have two leg portions but may have any number of leg portions, such as one or four.

The side portions 118, front portion 103, and back portion 120 form an outer perimeter of the illuminated cornhole platform 100. Along a substantial length of that perimeter is an outer illumination string 102 held in place by a plurality of cable clips 110. The outer illumination string 102 contains a plurality of light emitting sources, as is shown in more detail in FIG. 7. The outer illumination string 102 contains a first conductive wire and emits light which enables a person playing a game of cornhole to see an outline of the rectangular platform with minimal if any ambient illumination (i.e., at night).

Figure 2:
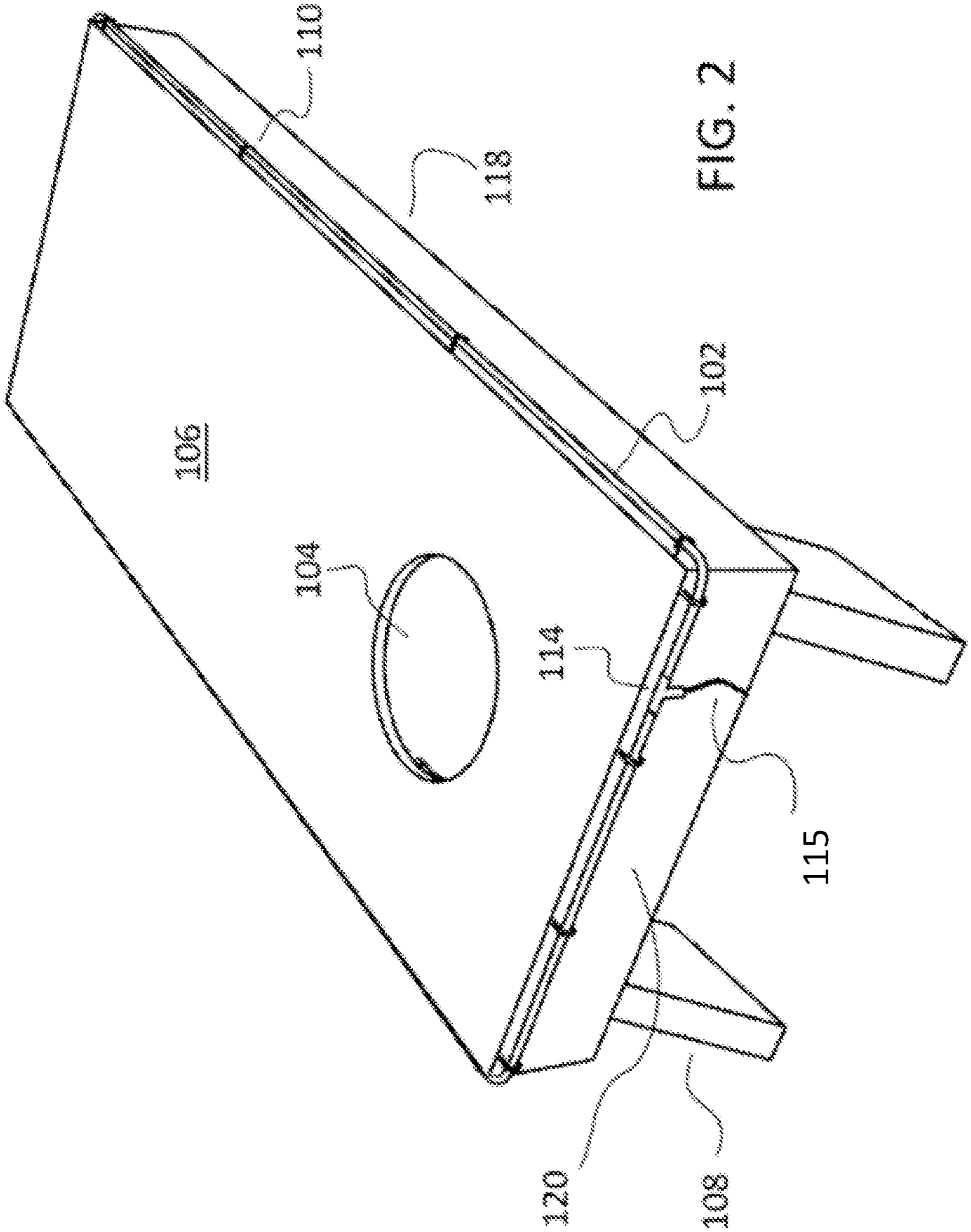
FIG. 2 illustrates a back-end perspective view of an illuminated cornhole platform.

FIG. 2 illustrates a back perspective view of the illuminated cornhole platform 100. The top portion 106 contains a hole portion 104 located off-center and designed to accept a tossed bag (e.g., "bean-bag"). The outer illuminating string 102 is placed along the outer perimeter formed by the side portion 118, back portion 120, and front portion 110 (see FIG. 1). The outer illuminating string 102 has a first end and a second end, both of which attach to the tee adapter 114. A first chord 115 extends through the tee adapter and into the outer illuminating string 102, as is discussed in more detail in FIG. 7.

Figure 3:
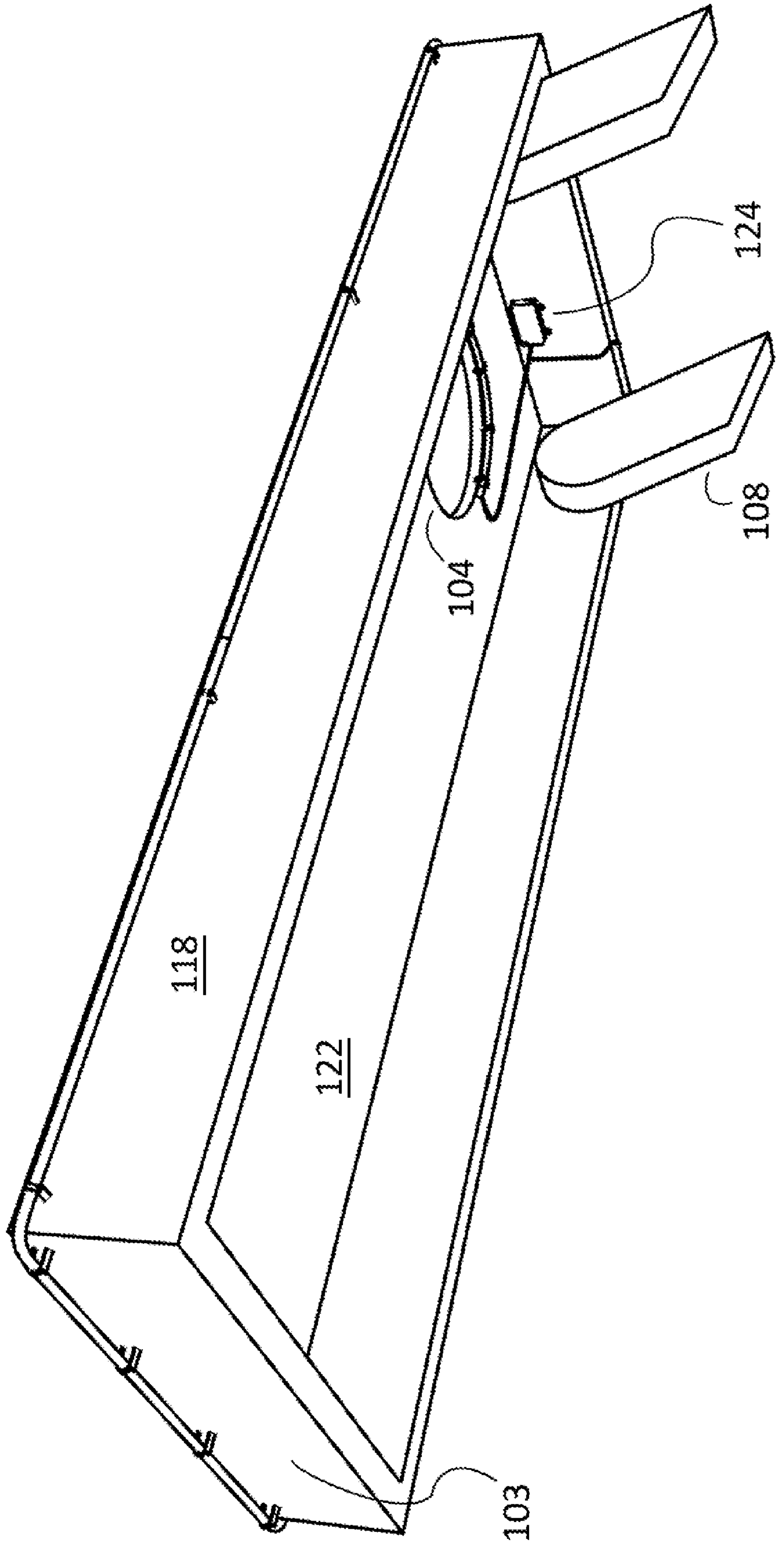
FIG. 3 illustrates a bottom perspective view of an illuminated cornhole platform.

FIG. 3 illustrates a bottom perspective view of the rectangular platform 100. The side portions 118, back portion 120, front portion 103, and a bottom portion 122 form an interior cavity. The leg portions 108 may be placed within that cavity. A power supply 124 may also be affixed to the back portion 120 within that cavity, in order to place the power supply close to the hole portion 104. The power supply 124 may also be affixed against the bottom portion 122 or in any other suitable location or any other structure of the platform.

Figure 4:
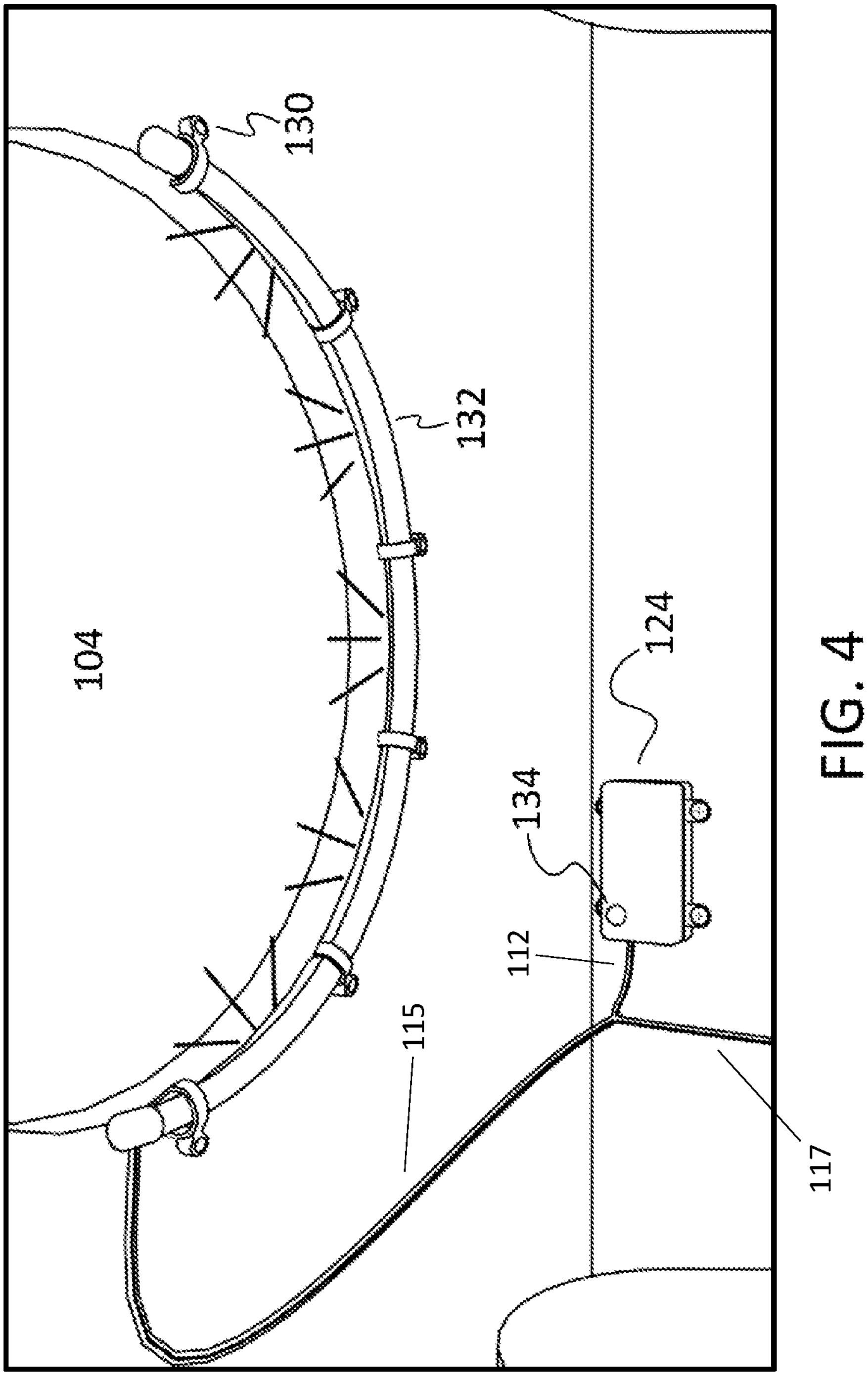
FIG. 4 illustrates a close-up bottom view of a hole in the illuminated cornhole platform.

FIG. 4 illustrates a close-up bottom view of the hole portion 104 and surrounding environment of the illuminated cornhole platform in the "on" state. The power supply 124 may be attached to the bottom portion 122 or back portion 120 by way of adhesive, threaded fastener, or other means. The power supply 124 contains a switch 134 that can interrupt the flow of electrical current. Extending out from the power supply is a leading wire 112 which splits into a first cord 115 and a second cord 117. The first cord connects to the outer illuminating string. The second cord connects to an inner illuminating string 132 containing a second conductive wire. The inner illuminating string 132 contains within it a plurality of light sources, preferably LEDs, and abuts the circumference of the hole portion 104. The inner illuminating string 132 is held in place by a plurality of cable clips 130. When the switch 134 is in the "on" state, the light sources of the inner illuminating string provide light, as is illustrated in FIG. 4. The structure of the inner illuminating string 132 is disclosed in more detail in FIG. 6. In an alternative embodiment, there is no leading wire 112 and the first cord 115 and second cord 117 extend out directly from the power supply 124. In a preferred embodiment neither cord contains illumination sources, which are contained in the conductive wires located within the illuminating strings.

Figure 5:
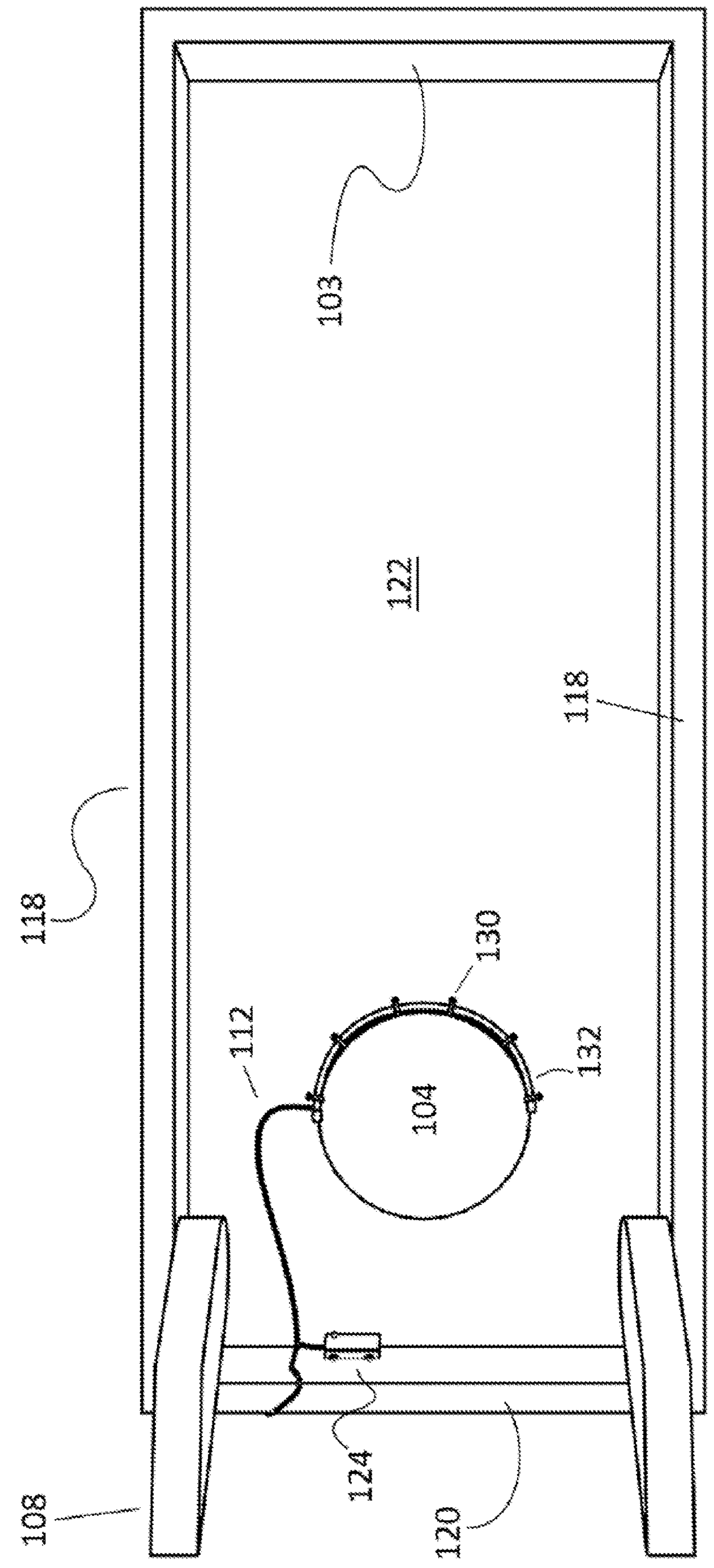
FIG. 5 illustrates a bottom view of the illuminated cornhole platform.

FIG. 5 illustrates a bottom view of the illuminated cornhole platform 100. The front portion 103, side portions 118, and back portion 120 are attached to the bottom portion 122 with an off-center hole 104. Abutting the circumference of the off-center hole 104 is the inner illuminating string 132, held in place by a plurality of cable clips 130.

The inner illuminating string 132 may abut one-half of the total circumference of the hole portion 104, as illustrated. The inner illuminating string 132 may also extend tangentially to form a "U" shape, wherein the two ends of the inner illuminating string 132 are extending in a straight line. In other embodiments, the inner illuminating string 132 may abut only one quarter of the total circumference of the hole portion 104. In any event, the inner illuminating string 132 may be placed in such a way as to not interfere or obstruct the hole portion 104 in order to allow a clear area for a bean bag to pass through.

Figure 8:
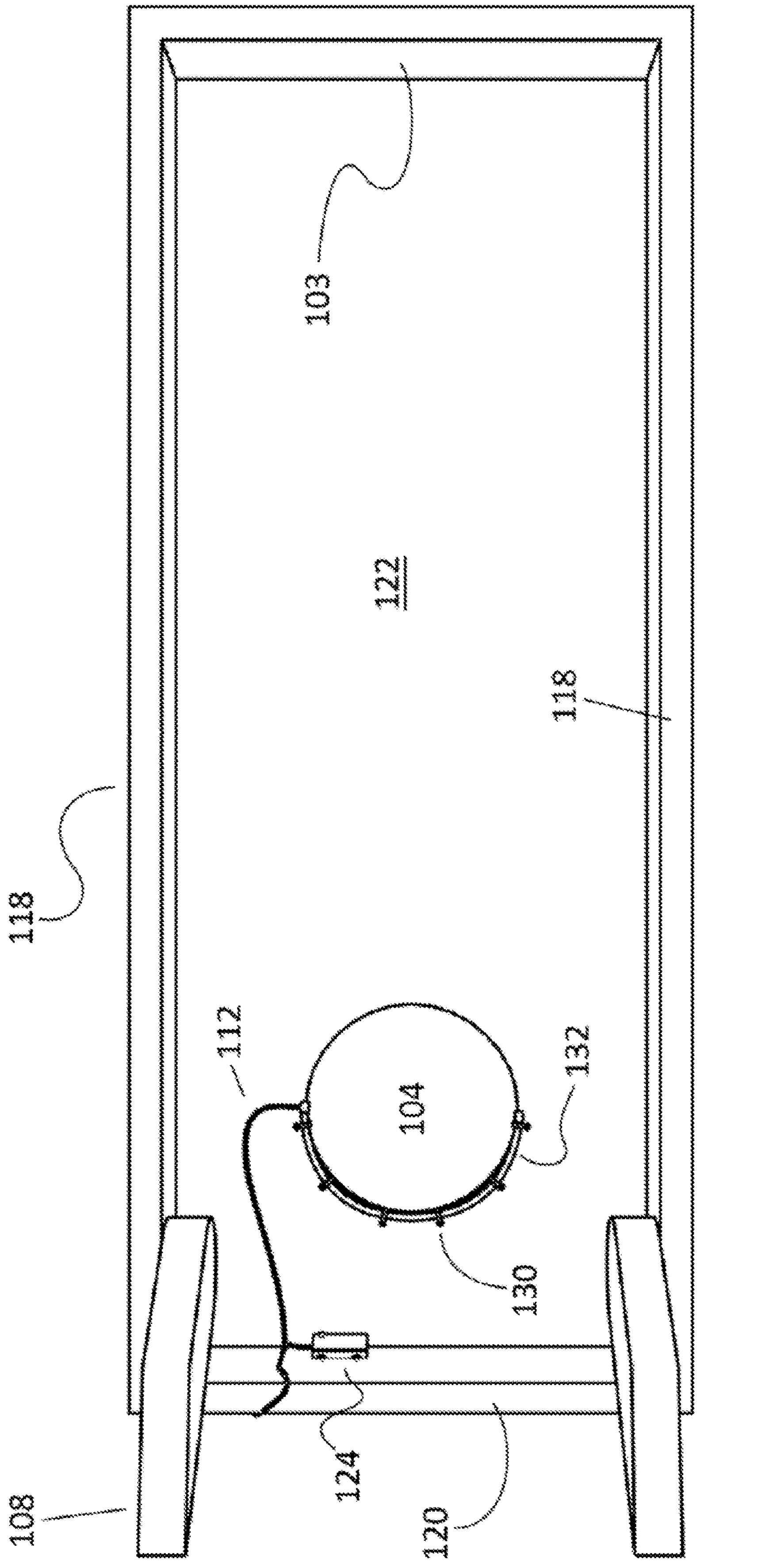
FIG. 8 illustrates a bottom view of the illuminated cornhole platform.

In a preferred embodiment, as is illustrated in FIG. 5, the inner illumination string 132 abuts no more than half of the circumference of the hole portion 104, oriented on the semi-circle closest to the front portion. With this set up, a player looking at the cornhole platform 100 from the front portion would not directly see or be exposed to the inner illumination string 132. This is desirable because light will still reflect off the side of the hole portion 104, without shining light directly at the player. Thus, the player can clearly identify the hole portion's location without having to directly stare at a light source. An alternative embodiment of FIG. 5 is illustrated in FIG. 8, wherein the player is capable of seeing the inner illuminating string 132. This may be desired if the player wishes to have a view of the inner illuminating string 132.

Figure 6:
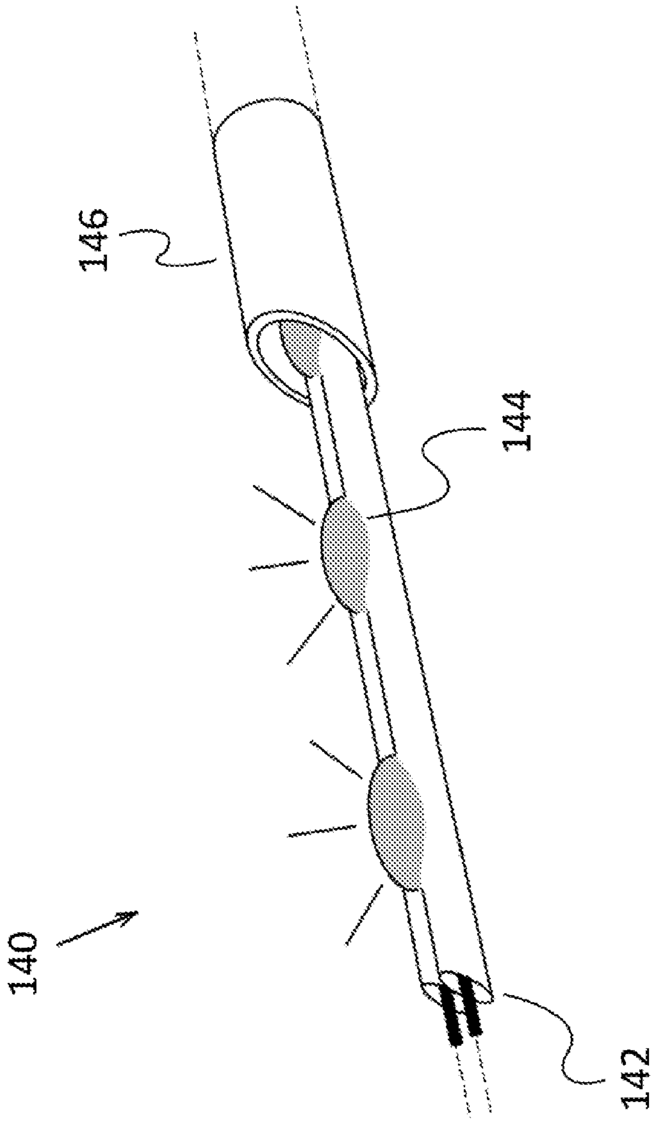
FIG. 6 illustrates a cutaway view of a segment of an illumination tube of the illuminated cornhole platform.

FIG. 6 illustrates a cutaway view of an illuminating string 140. An insulated tube 146 contains a conductive wire 142 with a positive and negative electrical end. The conductive wire 142 contains a plurality of illumination sources 144, which are located within the insulated tube 146. The illumination sources 144 in some embodiments may be Light Emitting Diodes (LEDs) or alternatively incandescent lights. The insulated tube 146 may be made of any suitable flexible material, such as polyethylene or vinyl. Ideally, the insulated tube 146 is made of material which clear enough to permit light from the light sources 144 to pass through the material. For example, clear polyethylene would permit light to pass through the material.

The illuminating string 140 may in some embodiments represent the interior structure of both the outer illuminating string and the inner illuminating string. In other embodiments, the inner illuminating string and outer illuminating string may have illumination sources spaced out at different intervals or have light sources of differing frequencies (i.e., color).

Figure 7:
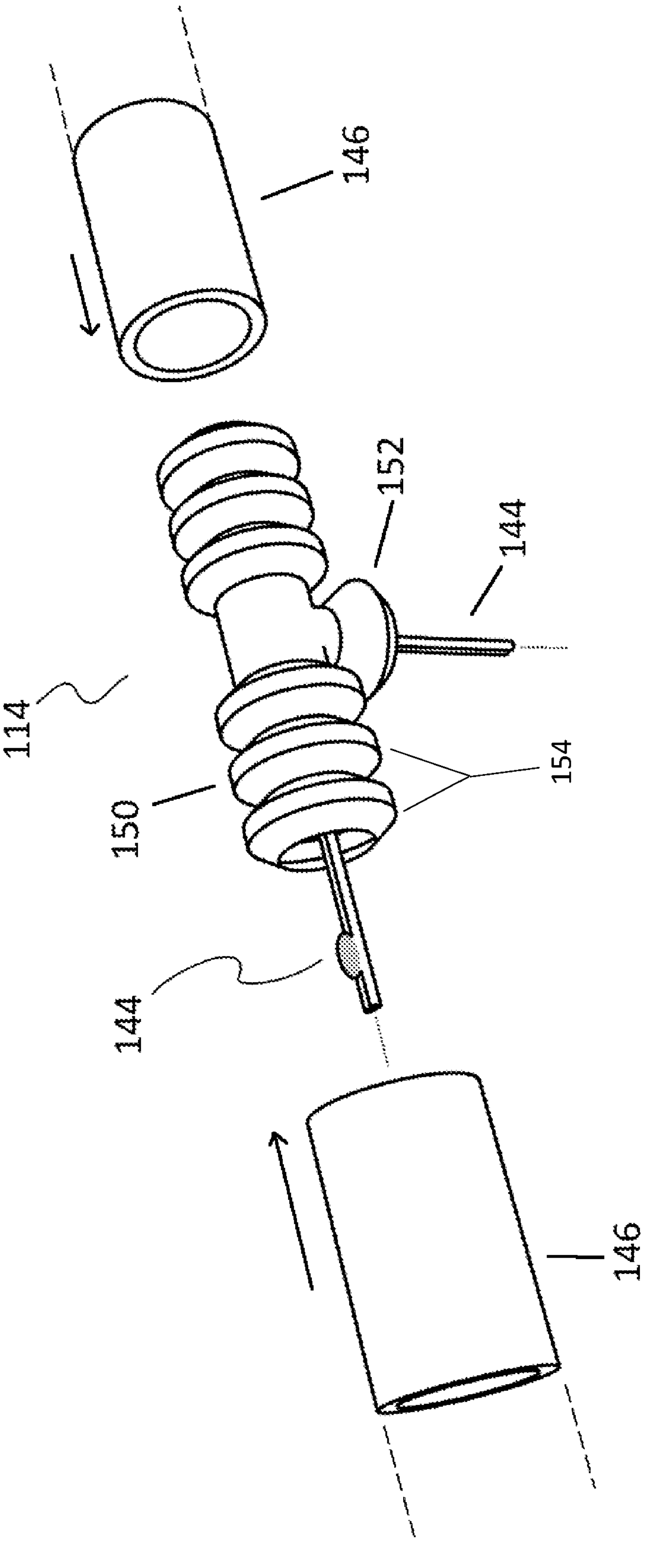
FIG. 7 illustrates a close-up exploded view of a tee adapter used on a portion of the illuminated cornhole platform.

FIG. 7 illustrates an exploded view of the tee adapter 114 of FIG. 1, and the tee adapter's interaction with the outer illuminating string 102 (see FIG. 1). The tee adapter 114 has two attachment ends 150 with a singular bottom opening 152 perpendicular to the attachment ends 150. The first cord 115 attaches to the first conductive wire 144 and is placed through the bottom opening 152 and exits the attachment end 150. The first cord 115 ends right before the bottom opening 152, as the first cord 115 does not contain illumination sources while the first conductive wire 144 docs.

Each attachment end 150 contains a number of ribs 154, although in other embodiments there may only be one rib per attachment end 150. Each rib has a radius which is slightly larger than an interior radius of the insulated tube 146. In this manner, placing the insulated tube over the attachment end will cause the tube to deform over the ribs 154, causing the insulated tube 146 to structurally lock into place with the tee adapter 114 and form a seal.

What is claimed is:

1. A kit for illuminating a cornhole platform, the cornhole platform being a rectangular platform comprising a top portion, at least two side portions, a front portion, a hole portion, at least one leg portion, and a back portion, the kit comprising:

an illuminating string comprising a first end, a second end, a main length, an insulated tube, and a conductive wire with a plurality of illumination sources, and a plurality of clips for securing the illuminating string to the rectangular platform;

wherein the illuminating string is configured to be placed along a circumference of a hole portion of a rectangular platform, and is configured to abut at least one half of the circumference.

2. The kit of claim 1, further comprising means for securing the illuminating string to the rectangular platform.

3. A kit for illuminating a cornhole platform, the cornhole platform being a rectangular platform comprising a top portion, at least two side portions, a front portion, a hole portion, at least one leg portion, and a back portion, the kit comprising:

an illuminating string comprising a first end, a second end, a main length, an insulated tube, and a conductive wire with a plurality of illumination sources, and a plurality of clips for securing the illuminating string to the rectangular platform;

wherein the illuminating string is configured to be placed along a majority of an outer perimeter of the rectangular platform such that the plurality of illumination sources outline the outer perimeter of the rectangular platform.

* * * * *